June 14, 1966
J. LA BARBERA
3,255,517
METHOD OF FORMING AN INTEGRAL TANK SHELL HEAT-EXCHANGE COIL
Original Filed Jan. 26, 1961
2 Sheets-Sheet 1
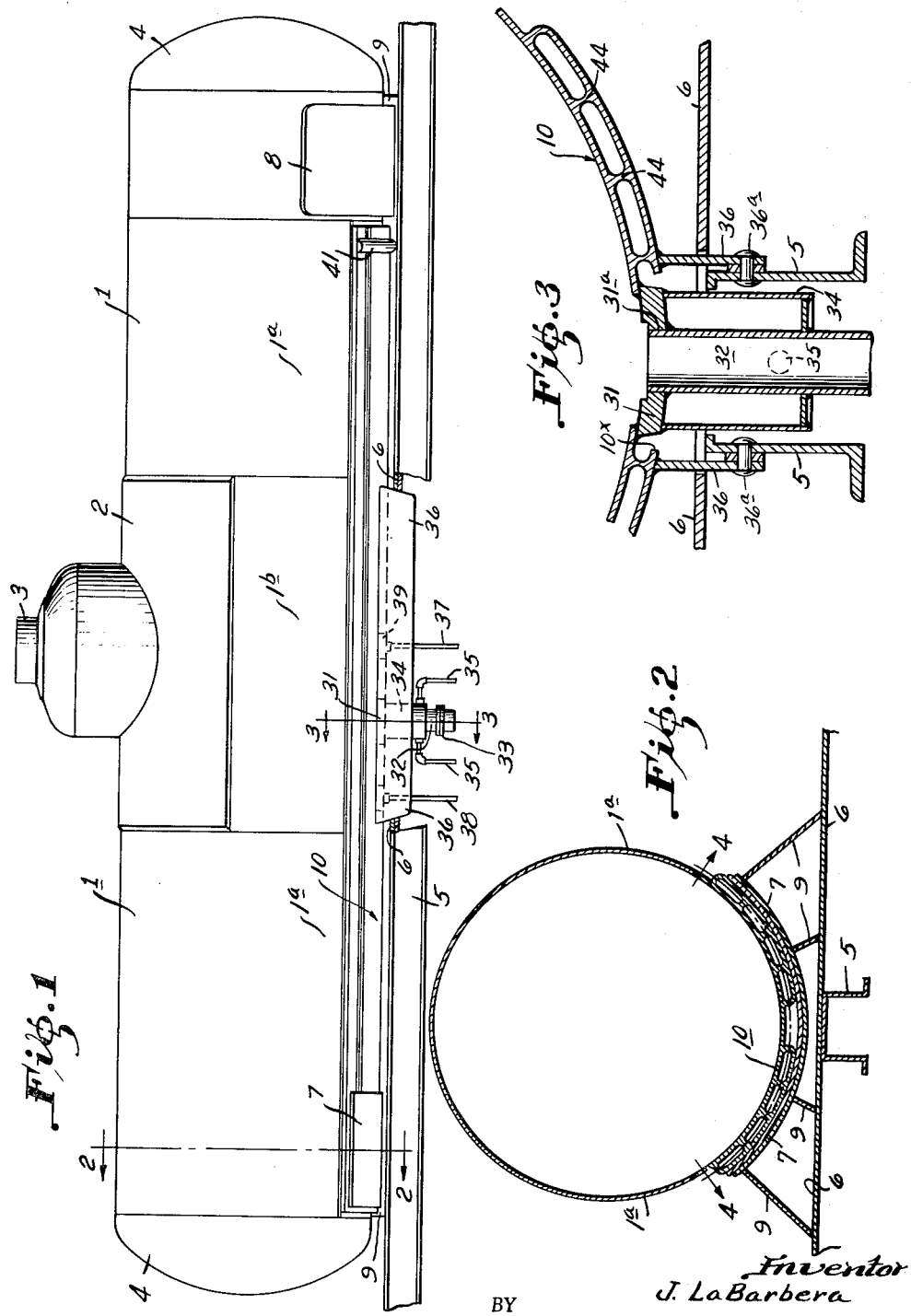
Inventor
J. LaBarbera
BY
ATTORNEY

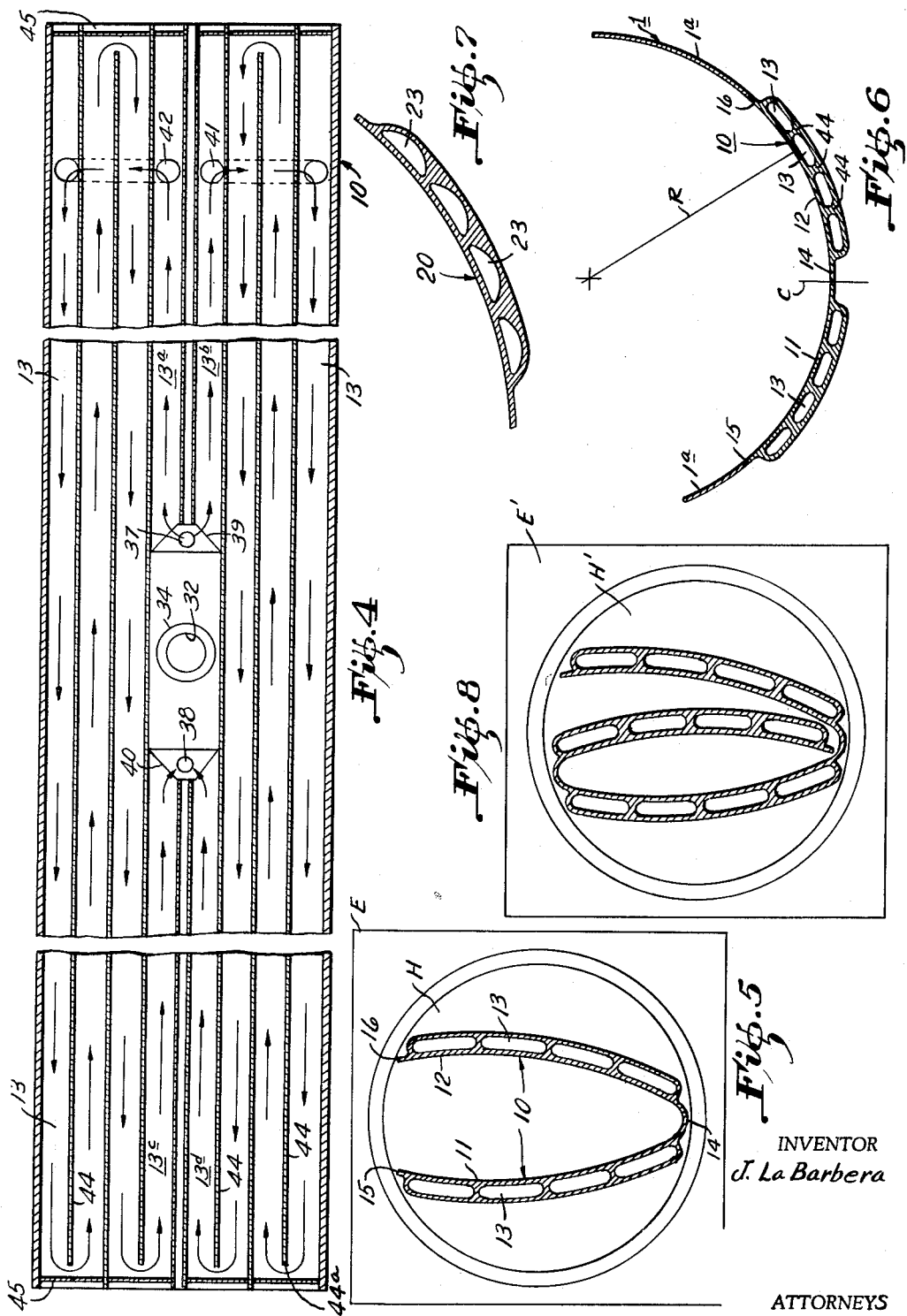

() # United States Patent Office 3,255,517
Patented June 14, 1966

3,255,517
METHOD OF FORMING AN INTEGRAL TANK
SHELL HEAT-EXCHANGE COIL
Joseph La Barbera, Shreveport, La., assignor to AMF
Beaird, Inc., a corporation of Delaware
Original application Jan. 26, 1961, Ser. No. 85,105, now
Patent No. 3,176,764, dated Apr. 6, 1965. Divided
and this application Dec. 28, 1964, Ser. No. 428,006
2 Claims. (Cl. 29—157.3)

This application is a division of Ser. No. 85,105, filed January 26, 1961, and now United States Patent No. 3,176,764.

This invention relates to a method of making tank wall sections having integral tubes forming heat-exchange ducts, and to tanks formed by joining together one or more sections of walls made by the above method, or by joining them with other types of walls to fabricate enclosed vessels having integrally-formed heat-exchange tubes.

It is the principal object of the invention to provide a method of making integral-coil tank wall sections wherein each section is made in whatever length may be desired, and these sections having relatively large transverse dimensions. In particular, it is a principal object of this invention to provide a way of making extruded integral-coil tank wall sections having transverse dimensions considerably greater than the maximum dimension of the extrusion die which makes the section. The present method teaches the extrusion of each section in partly folded form, and the subsequent unfolding of the partly-folded extrusions to provide a wall section of larger transverse extent, the word "transverse" in this specification referring to a direction or plane disposed normal to the direction of extrusion of the wall section or sections.

It is another important object of this invention to provide a way of enclosing the ends of a plurality of longitudinally extending extruded ducts to provide a tortuous path through these ductings for a fluid to flow in heat-exchange relation with the content of the tank of which the integral-coil wall section is a part.

Still another major object is to provide a novel way of making a large tank having integral heat-exchange ducts, such as is used to form a vehicular tank-car for example. By making one or more tank-wall sections by extrusion, these sections can be made in any length commensurate with the desired length of the tank, this feature lending a degree of flexibility to the present method of manufacture which is not provided by prior art casting methods such as that shown in expired U.S. Patent 1,856,338. The present extrusion method also provides tank-wall sections which require far less fitting and welding to build a complete tank than prior art methods employing casting techniques, or fabrication of wall sections by welding parts togther to form a composite heat-exchange tank-wall structure. Moreover, aluminum extrusions provide better heat-exchange conduction and a far lighter-weight structure for a tank, this being particularly important in connection with the use and transporting of vehicular tanks.

It is a further important object of the invention to provide an improved tank structure including integrally-formed heat-exchange ducts extending longitudinally of the tank, and the adjacent ducts being separated by intermediate web portions which form tank strengthening ribs, particularly advantageous to strengthen the undersides of vehicular tanks.

Other objects and advantages of this invention will become apparent during the following discussion of the drawings, wherein:

FIG. 1 is a side elevation of a tank made according to the present invention and supported on a platform shown partly in cross-section;

FIG. 2 is an enlarged sectional view taken along line 2—2 of FIG. 1;

FIG. 3 is an enlarged sectional view taken along line 3—3 of FIG. 1;

FIG. 4 is a sectional view taken along line 4—4 of FIG. 2;

FIG. 5 is an axial end view of an extruder head showing in cross-section a tank-wall section being extruded therefrom in partly-folded condition;

FIG. 6 is a cross-sectional view through a vessel showing the extruded wall section of FIG. 5 opened up to the diameter of the tank from the partly-folded condition in which it is extruded;

FIG. 7 is a sectional view through a part of an extruded wall section having integral ducts of different cross-sectional shape than the ducts shown in the other figures; and FIG. 8 is a view similar to FIG. 5, but showing the extrusion of three partly folded portions of a section.

Referring now to the drawings, FIGS. 1, 2, 3 and 6 show a large tank of the type frequently used on railroad flat cars, the tank being generally designated by the reference numeral 1, and having a center section 2 of conventional type including a filling opening having a cover 3 thereon. The tank also includes a head 4 at each end. The lower portion of the tank includes one extruded integral-coil arcuate tank wall section generally designated by the reference numeral 10 which runs nearly the full length of the cylindrical tank and is welded to the upper circular plates 1a and 1b. which comprise the remaining portion of the tank. FIGS. 1, 2, and 3 also show a portion of a railway car structure including a center sill 5 supporting a platform 6 which in turn supports several spaced saddles which include arcuate plates 7 and 8 which plates are supported on a plurality of radially disposed bed members 9, best illustrated in FIG. 2. These members actually form no part of the present invention and are merely illustrated for the sake of showing a practical embodiment of a tank including the integral-coil heat exchange tank wall sections 10 which are the subject of the present invention.

Turning now to a discussion of the integral-coil tank wall section 10, this section appears more clearly illustrated in FIGS. 3, 4 and 6, the section including two arcuate extruded thicker portions 11 and 12 which are symmetrical about the center line C. Each of these portions is an extruded relatively thick aluminum arc having a plurality of longitudinal ducts 13 extending through the full length thereof. These two thickened portions 11 and 12 are joined together by a relatively thinner portion 14 and are also terminated by thinner edge portions 15 and 16 which, as can be seen in FIGS. 2, 4 and 6, are welded to the arcuate plate 1a comprising the upper portion of the tank 1. The radius R illustrates that this tank is circular, although the present invention is by no means limited to a tank of circular cross-section.

In FIGS. 5 and 8 this same integral tank section 10 is shown in partly-folded position in which the thinner portion 14 of the wall section is partly folded about a small radius so as to cause the extreme ends 15 and 16 of the section 10 to approach each other. Note that both thickened portions 11 and 12 are extruded so that they need or subsequently, themselves, be bent in order to make them conform with the larger radius R of the completed tank.

In FIG. 5, a partly-folded double section 10 is shown being extruded out of an extrusion head H forming a part of an extrusion machine E, which is illustrated only schematically since the extrusion machine per se forms no part of the present invention.

In FIG. 8, a three-portion wall section is shown being extruded from the head H' of an extruder E'. In the practical embodiment of the present invention as actually manufactured, the wall section 10 extruded from the extruder is made of aluminum alloy, material ASTM B-209-6061-T6, although the present invention is obviously not to be limited to a particular material since a great range of suitable materials is known in the prior art anyone of which can be extruded in a manner satisfactory to implement the present invention.

FIG. 7 is a partial sectional view similar to that of FIG. 6 but illustrating an integral-coil wall section 20 which is generally similar to the wall section 10 except that the shape of the ducts 23 is different from the cross-sectional shape of the ducts 13. The ducts 13 have semi-circular ends separated by arcuate opposed wall portions which follow the arcuate shape of the inside of the tank 1. However, in FIG. 7 the cross-sectional shape of the ducts 23 in semi-elliptical with a 2:1 ratio, and the inside surface of these ducts are arcuate and generally follow the same contour as the arc of the tank of which they form a part. This second shape provides a somewhat stronger tank since less of the metal is omitted in the manufacture of the ducts since the elliptical shape of the ducts is somewhat stronger than the shape shown in FIG. 6 because more of the web material between ducts remains. This modification of FIG. 7 is enclosed merely to illustrate that different shapes of ducts are contemplated and are intended to be included within the scope of this invention. These ducts could be triangular, rectangular or circular, or even of some other irregular shape.

Returning now to a consideration of FIGS. 1, 2, 3 and 4, it will be seen that between the longitudinal ends of the extruded integral-coil wall section, there is located a manifold, best seen in FIGS. 1, 3 and 4. FIG. 3 illustrates a section through this manifold which shows that the tranverse center of the wall section 10 is cut away and a bottom outlet plate 31 is welded in its place, this plate being located in the bottom of the tank and visible also in FIG. 1. This bottom plate has an outlet pipe 32 communicating through an opening 31a in the plate 31 and welded to the latter. Any suitable type of valve and coupling can be used to control the flow of liquid from the outlet pipe 32, this coupling being schematically illustrated at 33 in FIG. 1. A larger diameter pipe 34 serves to strengthen the engagement of the outlet pipe 32 with the plate 31, and access to the space between the pipes 32 and 34 is provided by two pipes generally referred to as 35, which can best be seen in FIG. 1. In the vicinity of the outlet pipe 32 there is a pair of longitudinally disposed anchor plates 36 which are secured, for example, by means of rivets 36a, to the sill channel 5, the anchor plates 36 providing additional support for the integral-coil wall section 10 in the vicinity 10x of the wall section which is cut away to insert manifold plate 31. By this means the structural strength of the wall section 10 is not materially reduced in the vicinity of the outlet pipe.

Near the center of the wall section 10 are also located inlet and outlet pipes respectively labeled 37 and 38, these pipes communicating with ducts 13 of the wall section 10. As can be best seen in FIG. 4, there is a small manifold 39 connected with the duct inlet pipe 37 and communicating with the two innermost ducts 13a and 13b, FIG. 4, these ducts carrying liquid toward the right end of the wall section 10 and toward several cross-over pipes 41 and 42 which are welded on the outside of the wall section 10 and carry liquid from the innermost ducts to the outermost ducts at the same end while bypassing the two intermediate ducts on both sides. The liquid then travels longitudinally up the outermost duct on each side of the wall section 10 and is reversed at the far end to come back down the next adjacent duct, the zigzag flow of the fluid continuing until it enters the ducts 13c and 13d and returns to a manifold 40 which communicates with the outlet pipe 38. FIG. 4 therefore provides a flow diagram illustrating the direction of flow of the fluids within the ducts so that the flow can be followed from the inlet pipe 37 to the outlet pipe 38.

The extrusions of which the wall sections 10 are made lend themselves to a simple means for joining the ends of the ducts for the purpose of reversing the directional flow therein. For instance, the webs 44 between the adjacent ducts and separating the latter are relatively thin and can be machined away at their ends as shown at 44a in FIG. 4. If the partitions 44 are machined away at their ends, small end plugs 45 can then be inserted to close the ducts and thereby provide reversal of the flow. These partitions are preferably welded in the ends of the ducts and seal the ends against loss of fluid. Thus, a very simple and effective heat exchange structure is provided which is conveniently manufactured by the extrusion process so that any desired length of duct work can be manufactured to form a part of any particular size tank to be constructed.

The process taught by the present invention involves the extrusion of a section of tank wall having ducts provided therein, the extrusion being done with the wall sections folded toward each other about a relatively small radius so that a reasonable-size extrusion head can be used to extrude a relatively larger wall section. The wall section when extruded is then opened up to the position shown in FIG. 6 so that it conforms with the curvature of the tank of which it is to become a part, and then this integral-duct wall section 10 is welded on the plates which form the tank. Alternate partitions between the ducts are then machined away and the ducts are plugged on their ends so that a zig-zag flow is provided within the ducts. Finally, means is added for obtaining access to the bottom of the tank through the ducts by adding an outlet plate having inlet and outlet manifold at its ends, which manifolds are connected into the ducts. This type of construction is inexpensive and quick, and makes a highly satisfactory tank, especially well adapted for use on vehicles.

The present invention is not to be limited to the exact forms shown in the drawings, for obviously changes may be made therein within the scope of the following claims.

I claim:

1. The method of making a vessel having a wall section including heat-exchange ducts integral therewith, comprising the following steps: extruding a length of wall section including at least two hollow thicker wall portions mutually separated by a thinner wall portion and partly folded toward each other thereabout during said extruding step; unfolding said thicker wall portions about said thinner portions to form a section of wall conforming with the desired shape of the vessel; connecting some of said ducts serially; completing said vessel by attaching other wall plates to said extruded section; and providing inlet and outlet means communicating with said hollow-wall portions to form the heat-exchange ducts.

2. The method of making a tank having at least one curved section of wall integrally including heat-exchange ducts, comprising the following steps: extruding at least one length of wall section including at least two transversely curved thicker wall portions having ducts extending longitudinally thereof, and each pair of thicker portions being separated by a thinner wall portion and folded toward each other thereat about a smaller radius of curvature during said extruding step; unfolding each wall section about said thinner portion to form a section of tank-wall having an overall curvature conforming with the desired final shape of the tank; attaching plates to said sections to form the complete tank; removing partitions between some of said ducts, plugging some of said ducts to form a zig zag serial flow within said ducts; and providing inlet and outlet means communicating with said ducts.

References Cited by the Examiner
UNITED STATES PATENTS

| | | | |
|---|---|---|---|
| 733,191 | 7/1903 | Griesser | 165—154 |
| 1,118,514 | 11/1914 | Smith | 165—169 |
| 1,968,813 | 8/1934 | Ackerman | 29—157.3 |
| 2,190,494 | 2/1940 | Templin. | |
| 2,286,271 | 6/1942 | Higham | 165—172 X |
| 2,573,539 | 10/1951 | Bryce | 165—168 |
| 2,672,323 | 3/1954 | Larson | 165—154 X |
| 2,681,734 | 6/1954 | Braeuninger | 207—17 |

FOREIGN PATENTS 1,066,524   10/1959   Germany.

WHITMORE A. WILTZ, *Primary Examiner.*

J. D. HOBART, *Assistant Examiner.*